J. D. SMITH.
Strainer for Wash-Basins and Bath-Tubs.
No. 162,705.                                        Patented April 27, 1875.
Fig. 1.
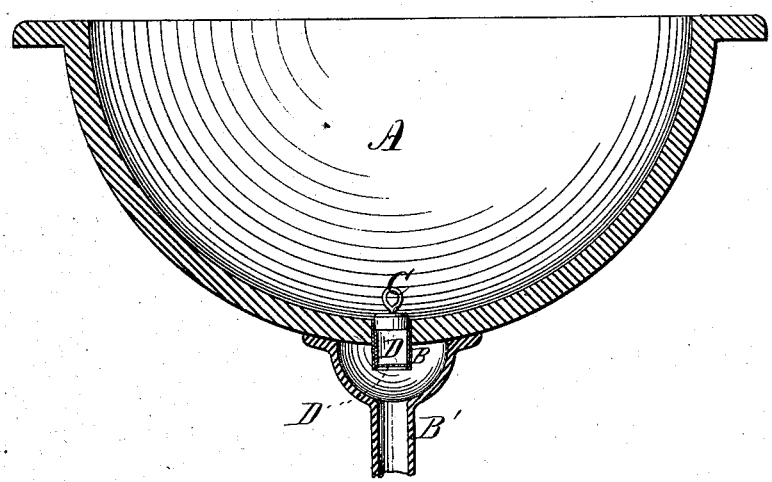
Fig. 2.  Fig. 3.  Fig. 4.
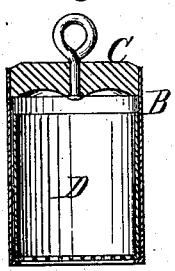 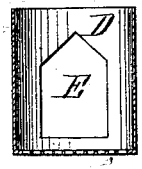 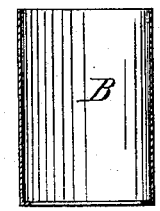
Fig. 5.
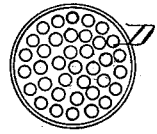
Witnesses:
John Tyler
Arthur L. McIntire
Inventor:
James D. Smith
By Atty Wm C. McIntire

UNITED STATES PATENT OFFICE.

JAMES D. SMITH, OF WASHINGTON, DISTRICT OF COLUMBIA.

IMPROVEMENT IN STRAINERS FOR WASH-BASINS AND BATH-TUBS.

Specification forming part of Letters Patent No. 162,705, dated April 27, 1875; application filed December 23, 1874.

*To all whom it may concern:*

Be it known that I, JAMES D. SMITH, of Washington, in the county of Washington and District of Columbia, have invented certain new and useful Improvements in Strainers for Wash-Basins, &c.; and I do hereby declare that the following is a full and exact description thereof, reference being had to the accompanying drawings making a part of this application.

My invention relates to a novel means for preventing the choking up of the waste-pipes of stationary wash-basins and bath-tubs. It has for its object to provide a removable strainer adapted to fit within the waste-pipe below the base of the plug, whereby any accumulations of solid or impeding matter may be gathered and removed all together; and with this object in view my invention consists in forming a strainer, of suitable material, with cylindrical or truncated cone-shaped sides and perforated bottom, adapted to be placed within the waste-pipe below the plug, and readily removable therefrom, as will be hereinafter more fully set forth.

To enable those skilled to fully understand the same, I will describe my invention, referring by letters to the accompanying drawings, in which—

Figure 1 is a vertical section of a wash-basin and waste-pipe with my improved strainer in place. Fig. 2 is a detail view, in section and on an increased scale, of a section of waste-pipe with my improved strainer in place, and the plug in position. Fig. 3 is a section of the strainer removed; Fig. 4, a section of the waste-pipe; and Fig. 5, a bottom view of my strainer.

Similar letters indicate like parts in the several views.

A is an ordinary basin. B is the waste-pipe, and B' a secondary waste-pipe; and C, the plug, all of which is common. D is my improved strainer, which will be better understood by reference to Figs. 2, 3, and 5. This strainer is made cylindrical, or like an inverted truncated cone, with its bottom perforated or slashed or cross-barred, and having its sides at one or more points cut away, as seen at E, Fig. 3, to afford a hold for the finger to remove it from the waste-pipe when desirable. It may be made in any other suitable shape, so long as the object in view is not sacrificed. It is adapted to lie below the base of the plug C, so as to allow it to rest lightly in its seat.

The operation of my invention is obvious. The plug C being removed, any solid or impeding matter contained in the water is caught within the strainer D; and when the accumulation is such as to retard the flow of water, and render the removal of this matter desirable, one finger is passed within the waste-tube and into the space E of the strainer D, when it is lifted out and its contents dumped.

What I claim as new, and desire to secure by Letters Patent, is—

As a new article of manufacture, a strainer for wash-basins or bath-tubs, consisting of a perforated cup adapted to be dropped within and removed from the waste-pipe, and being of such length as to readily admit of the insertion of the ordinary plug within the upper end of the waste-pipe, substantially as and for the purpose set forth.

Witness my hand to the foregoing specification on this 19th day of December, 1874.

JAS. D. SMITH.

In presence of—
    H. T. MUNSON,
    ARTHUR L. MCINTIRE.